United States Patent
Brown

(10) Patent No.: US 7,692,395 B2
(45) Date of Patent: Apr. 6, 2010

(54) EXTRAPOLATION OF BACK EMF SIGNALS IN BRUSHLESS DC MOTORS

(75) Inventor: Robert G. Brown, New Hartford, CT (US)

(73) Assignee: The Bergquist Torrington Company, Chanhassen, MN (US)

( * ) Notice: Subject to any disclaimer, the term of this patent is extended or adjusted under 35 U.S.C. 154(b) by 265 days.

(21) Appl. No.: 11/941,725

(22) Filed: Nov. 16, 2007

(65) Prior Publication Data

US 2009/0128071 A1    May 21, 2009

(51) Int. Cl.
*H03K 5/00* (2006.01)

(52) U.S. Cl. ............ 318/400.13; 318/400.16; 318/400.34

(58) Field of Classification Search ............ 318/400.16, 318/254.1, 400.26, 400.27, 400.34, 400.35, 318/400.13, 400.1
See application file for complete search history.

(56) References Cited

U.S. PATENT DOCUMENTS

| | | | |
|---|---|---|---|
| 4,356,437 A | 10/1982 | Saito et al. | |
| 4,743,815 A * | 5/1988 | Gee et al. | 318/400.11 |
| 5,044,897 A | 9/1991 | Dorman | |
| 5,079,467 A | 1/1992 | Dorman | |
| 5,144,209 A | 9/1992 | Ingji et al. | |
| 5,319,290 A | 6/1994 | Yoshino et al. | |
| 5,334,917 A * | 8/1994 | Lind | 318/400.35 |
| 5,444,341 A | 8/1995 | Kneifel, II et al. | |
| 5,625,264 A | 4/1997 | Yoon | |
| 5,777,448 A * | 7/1998 | Matsui | 318/400.06 |
| 5,869,946 A | 2/1999 | Carbobolante | |
| 5,923,141 A | 7/1999 | McHugh | |
| 6,121,736 A | 9/2000 | Narazaki et al. | |
| 6,124,689 A | 9/2000 | Kardash | |
| 6,369,535 B1 | 4/2002 | Wang et al. | |
| 6,650,084 B2 | 11/2003 | Fujioka et al. | |
| 6,661,192 B2 * | 12/2003 | Copeland | 318/400.35 |
| 6,975,082 B2 | 12/2005 | Crain et al. | |
| 7,026,772 B2 | 4/2006 | Quirion | |
| 7,141,949 B2 | 11/2006 | Harwood | |
| 7,436,145 B2 * | 10/2008 | Gauthier et al. | 318/636 |
| 7,592,761 B2 * | 9/2009 | MacKay | 318/254.1 |
| 2005/0110442 A1 | 5/2005 | Trifilo | |
| 2007/0013330 A1 | 1/2007 | Noh | |

OTHER PUBLICATIONS

"Sensorless BLDC Control With Back EMF Filtering", Reston Condit, Microchip AN1083, Microchip Technology, Inc 2007, pp. 1-14.

* cited by examiner

*Primary Examiner*—Bentsu Ro
*Assistant Examiner*—Thai Dinh
(74) *Attorney, Agent, or Firm*—Haugen Law Firm PLLP; Frederick W. Niebuhr

(57) ABSTRACT

A controller is provided for operating a DC motor through a commutation circuit and for synchronizing the commutation circuit to motor position and speed by measuring back EMF voltages along commutation cycle steps during which the measured phase is not being driven. In connection with each such step, the back EMF voltage is measured at two points offset from the center of the step. The controller uses the measured voltages and their corresponding locations to locate the center point of the step through extrapolation. The motor can be analyzed for determining suitable locations for the measuring points.

20 Claims, 8 Drawing Sheets

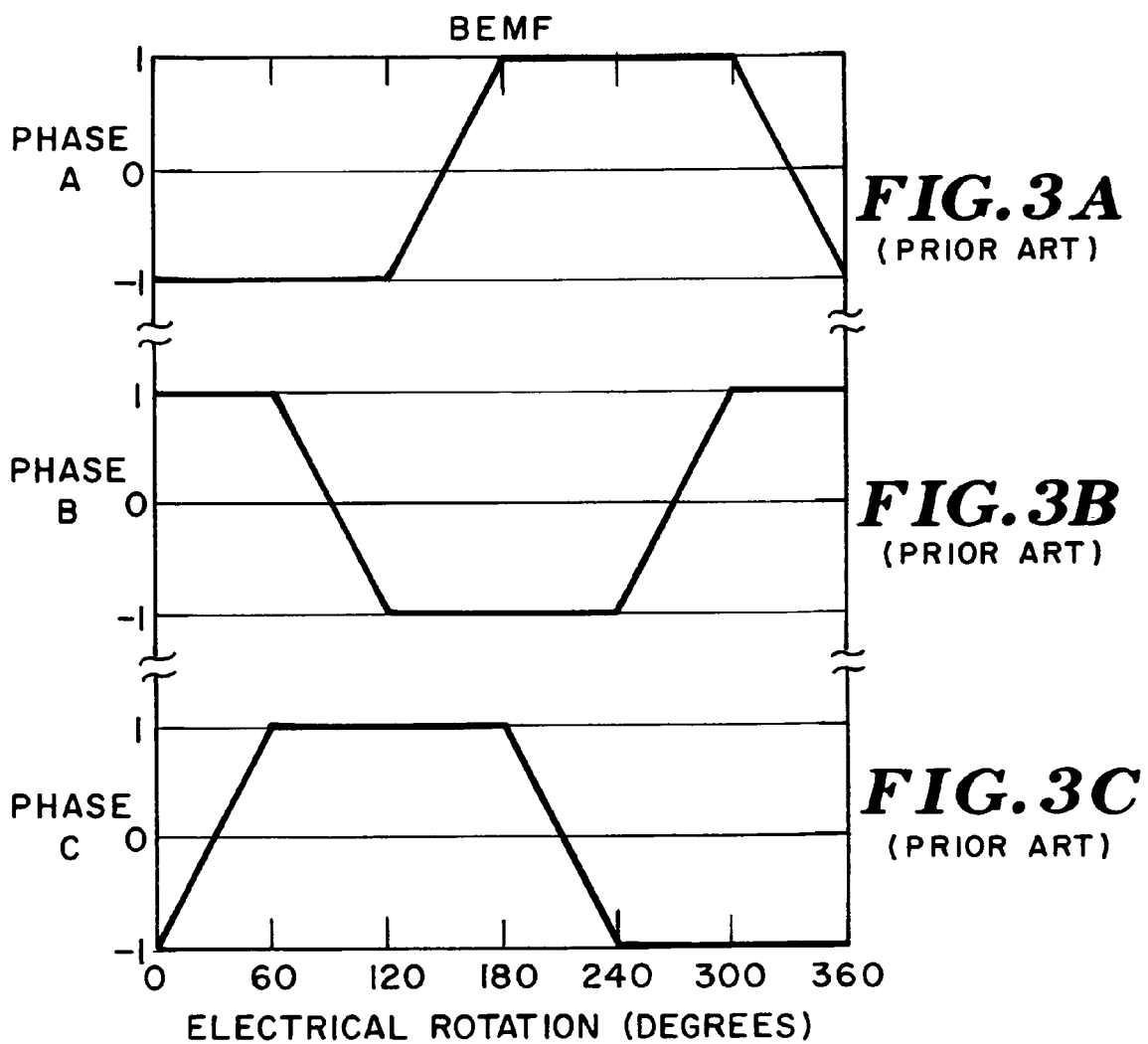

|    | 0 | 1 | 2 | 3 | 4 | 5 |
|----|---|---|---|---|---|---|
| AH | 0 | 0 | 0 | 1 | 1 | 0 |
| BH | 1 | 0 | 0 | 0 | 0 | 1 |
| CH | 0 | 1 | 1 | 0 | 0 | 0 |
| AL | 1 | 1 | 0 | 0 | 0 | 0 |
| BL | 0 | 0 | 1 | 1 | 0 | 0 |
| CL | 0 | 0 | 0 | 0 | 1 | 1 |

EXTRAPOLATION OF BACK EMF SIGNALS IN BRUSHLESS DC MOTORS

BACKGROUND OF THE INVENTION

The present invention relates to controllers that govern electrically commutated motors, and more particularly to controllers that use back EMF signals to determine rotor position.

Brushless DC motors have been utilized increasingly to replace brushed DC motors in numerous applications, primarily for their advantages of lower cost, higher efficiency, and longer useful life. Electronically commutated motors and drivers generally are provided in two types: sinusoidally commutated motors and trapezoidally commutated motors.

The latter are known as trapezoidally commutated motors because they have a somewhat trapezoidally-shaped back EMF waveform. In a three-phase motor, the phases are driven intermittently and in pairs so that at any given time one of the phases is not driven. This allows the back EMF signal, in particular its zero crossing, to be used to determine rotor position. This configuration is referred to as a sensorless drive.

The motor is driven through selective application of voltages to the different phases in a repeating sequence, i.e. a commutation cycle. FIG. 1 illustrates the six steps of a commutation cycle in a standard brushless DC motor. During each step, two of the phases are in an active state, i.e. either driven at a high voltage or driven at a low voltage, while the third phase is not driven. Between each pair of succeeding steps, two of the phases transition, either from an active state to the inactive state or from the inactive state to one of the active states.

FIG. 2 graphically illustrates the commutation cycle, with motor phases A, B, and C aligned to facilitate recognizing simultaneous transitions. It is to be appreciated that the levels "1," "-1," and "0" respectively represent a high voltage, a low voltage (which may be ground), and a center voltage midway between the high and low voltages; in other words, the sum of the high and low voltages divided by two.

FIG. 3 graphically represents the back EMF voltages measured at motor phases A, B, and C over the commutation cycle. Like the applied voltages in FIG. 2, the back EMF voltages in FIG. 3 behave according to the cycle of 360 degrees of electrical rotation, with six steps or segments each with an angular dimension of 60 degrees.

During commutation cycle steps when a given one of the phases is driven, its voltage corresponds to the drive voltage, e.g. positive or negative 1. During segments when the given phase is not driven, the back EMF voltage changes from the voltage applied during the previous segment to the voltage to be applied in the following segment, e.g. as seen in the first cycle segment for phase C in changing from -1 to 1. Further, the change in voltage is substantially linearly related to the change in angular dimension. As a result, the center voltage, i.e. zero voltage in FIG. 3, corresponds to the angular center of each commutation cycle segment.

The correspondence of the zero crossings with cycle segment midpoints is the basis for sensorless commutation of brushless DC motors. Since the zero crossings coincide with the commutation cycle segment midpoints, they can be used to determine starting points for the cycle segments, either in terms of direct angular rotor position or in terms of timed intervals in conjunction with sensing motor rotational speed.

However, it is not always possible to measure the back EMF voltage at the correct zero crossing point. For example, when a given phase moves from a "driven" commutation cycle step during which one of the drive voltages is applied, to an "undriven" segment during which the given phase is not driven, the given phase demagnetizes during the undriven step. At the beginning of the undriven step, the voltage at the given phase includes the back EMF voltage and the voltage generated by demagnetization. The back EMF voltage cannot be measured until demagnetization is complete. Thus, in configurations where the time required for demagnetization exceeds the time equivalent of one-half of the cycle step, it is not possible to directly measure the back EMF voltage at the zero crossing.

Another case in which the back EMF zero crossing may not be measurable directly is when a driving voltage to a given phase is pulsed or chopped. For example, using a half chop to control a driving potential for each phase can result in a back EMF signal measurable only during times when the associated chopped phase is being driven. Unless one of the driven periods coincides with the zero crossing point, the zero crossing cannot be measured directly.

Therefore, the present invention has several aspects directed to one or more of the following objects:
to provide a sensorless drive for a brushless DC motor adapted to synchronize a commutation cycle and the motor, without the need to sense zero crossing of the back EMF signals;
to provide a process for maintaining a commutation cycle synchronized with the position and speed of an electrically commutated motor by measuring back EMF voltages at locations other than the midpoints of commutation steps;
to provide a controller for a DC motor commutation circuit configured to selectively sample back EMF voltages only during times within each commutation cycle step during which the back EMF voltage is directly measurable; and
to provide a process for predetermining off-center locations within the commutation cycle steps for measuring back EMF voltages for a more reliable indication of cycle step center points.

SUMMARY OF THE INVENTION

To achieve these and other objects, there is provided a device for controlling a brushless DC motor. The device includes a first data storage area. The storage area includes a plurality of inputs adapted to be coupled individually to different stator windings corresponding to different motor phases of a brushless DC motor to receive voltage information corresponding to voltages at their associated stator windings. The device includes a commutation control signal generator adapted to be coupled to a commutation circuit of a brushless DC motor. The signal generator provides control signals to the commutation circuit and thereby operates the commutation circuit according to a commutation cycle having a plurality of communication cycle segments symmetrically arranged over a motor electrical rotation of 360 degrees including selected commutation cycle segments during which a given one of the stator windings is not driven. A sampling function is operatively associated with the first data storage area, operative during each of the selected commutation cycle segments to sample the voltage information of the given stator winding at first and second predetermined points in the selected segment corresponding to first and second angular locations along the motor electrical rotation. A second data storage area is associated with the sampling function for receiving the sampled voltage level information as first and second voltages corresponding respectively to the first and second angular locations. A center point generator is associated with the second data storage area, adapted to use the first and second voltages in combination with the first and second angular locations to generate a center point signal indicating an angular center of one of the commutation segments. The device further includes a timing function. The commutation control signal generator is associated with the timing function and the center point generator and adapted to use the center point signal to generate the control signals in synchronism with motor speed and position.

When dealing with the aforementioned demagnetization effect, the sampling function is configured to sample the voltages only at points corresponding to angular locations that follow the center point of each commutation cycle segment. In applications where one of the driving voltages is chopped or pulsed, the sampling points are selected to coincide with times when the pulsed phase is driven. In both cases, the voltages at the stator widenings are analyzed, e.g. viewed using an oscilloscope, while operating the motor at different speeds. The analysis reveals suitable angular or temporal locations for sampling the back EMF signal.

With reference to FIG. 3, the linear relationship between voltage and angular position is described by the formula:

$$y = mx + b$$

where "y" is the back EMF voltage, "x" is the angular position, "m" is the slope, and "b" is a constant (e.g. −1 in the first cycle segment shown for phase C). The same equation can be rewritten as:

$$x = y/m + b/m$$

In this form, the constant "b/m" represents an angular position, e.g. 30 degrees when y is equal to zero in the first cycle segment shown for phase C. Alternatively, if the constant b/m has a value of 210 degrees, the zero voltage value is related to the center point of the fourth cycle segment shown for phase C in FIG. 3. Moreover, the value of constant b/m can be chosen to correlate the initial zero crossing of phase C to center points of other phases (when not driven) if desired, e.g. 90 degrees and 150 degrees to locate center points in the second segment shown for phase B and the third segment shown for phase A, respectively.

The linear function is determined by sampling voltages at two locations, both offset angularly from the zero crossing. The voltages, in combination with the angular locations of the sampling points, are used to solve for the slope and constant associated with that cycle segment, thus to locate the center point of the segment by extrapolation. The constant b/m can be increased or decreased in 60 degree increments to locate the center points of the other cycle segments. While the sampled voltages in the context of FIG. 3 are between zero and one, or between zero and negative one, it may be appreciated that the sampling and solving steps can be performed in the broader context of center voltages between high and low voltages.

Another aspect of the invention is a process, in a brushless DC motor configuration, for maintaining the commutation cycle synchronized with motor position. The process includes:

a. sensing a voltage at a given one of a plurality of stator windings corresponding to different phases of a DC motor operated according to a commutation cycle encompassing 360 degrees of electrical rotation composed of symmetrically arranged commutation cycle segments including selected segments during which the given stator winding is not driven;

b. sampling the sensed voltages at first and second predetermined points within one of the selected commutation cycle segments corresponding respectively to first and second angular locations along the electrical rotation, to indicate respective first and second voltages in the given stator winding at the first and second predetermined points;

c. using first and second voltages in combination with the first and second angular locations to locate a center point corresponding to a center of one of the commutation cycle segments; and d. generating a center point signal as an indication of a current angular or temporal position of the center point, and using the center point signal to synchronize the commutation cycle with motor angular position.

Another aspect of the invention is a system for controlling a brushless DC motor. The system include a motor commutation circuit adapted for coupling between a DC power supply and a plurality of stator windings corresponding to different motor phases. The commutation circuit is adapted to apply to each phase one of several alternative states including: (i) a first active state for biasing the output terminal to a high voltage to drive an associated stator winding at the high voltage; (ii) a second active state for biasing the output terminal at a low voltage to drive the associated stator winding at the low voltage; and (iii) an inactive state in which the associated stator winding is not driven.

A is controller operatively coupled to the commutation circuit to selectively apply different ones of the alternative states to different phases to operate the motor according to a commutation cycle composed of commutation cycle segments arranged symmetrically about 360 degrees of electrical rotation.

The controller is coupled to receive a back EMF voltage signal from each of the stator windings, and comprises: (i) a sampling function adapted to sample the back EMF signal from a given stator winding at first and second predetermined points within a selected commutation cycle segment during which the given stator winding is not driven, said predetermined points corresponding to first and second angular locations along the electrical rotation yielding respective first and second voltages; (ii) a center point locating function configured to use the first and second voltages and their corresponding angular locations to determine a commutation cycle segment center point; (iii) a center point generator for generating a center point signal indicating a current angular position of the center point along the 360 degrees of electrical rotation; and (iv) a commutation circuit control function for determining cycle segment center points and starting points in response to receiving the center point signal thereby to operate the commutation circuit according to the commutation cycle in synchronous relation to motor position and speed.

Thus in accordance with the present invention, a controller is configured to selectively sample the back EMF signals for the different phases of a brushless DC motor, to derive center points of the commutation cycle steps when direct measurement of the back EMF signals at the center points is difficult or impossible. As a result, sensorless drives can be employed in configurations that otherwise would require separate position detectors such as Hall effect sensors.

IN THE DRAWINGS

For a further understanding of the foregoing and other advantages, reference is made to the following detailed description and to the drawings, in which:

FIG. 1 is a flow chart depicting a commutation cycle for a three phase DC motor;

FIGS. 2A-C graphically depict voltages applied to the different phases;

FIGS. 3A-C graphically depict the back EMF voltages in phases A-C corresponding to the applied voltages in FIG. 2;

FIG. 4 schematically illustrates a brushless DC motor, driver, and controller configured in accordance with the present invention;

Figure 8:
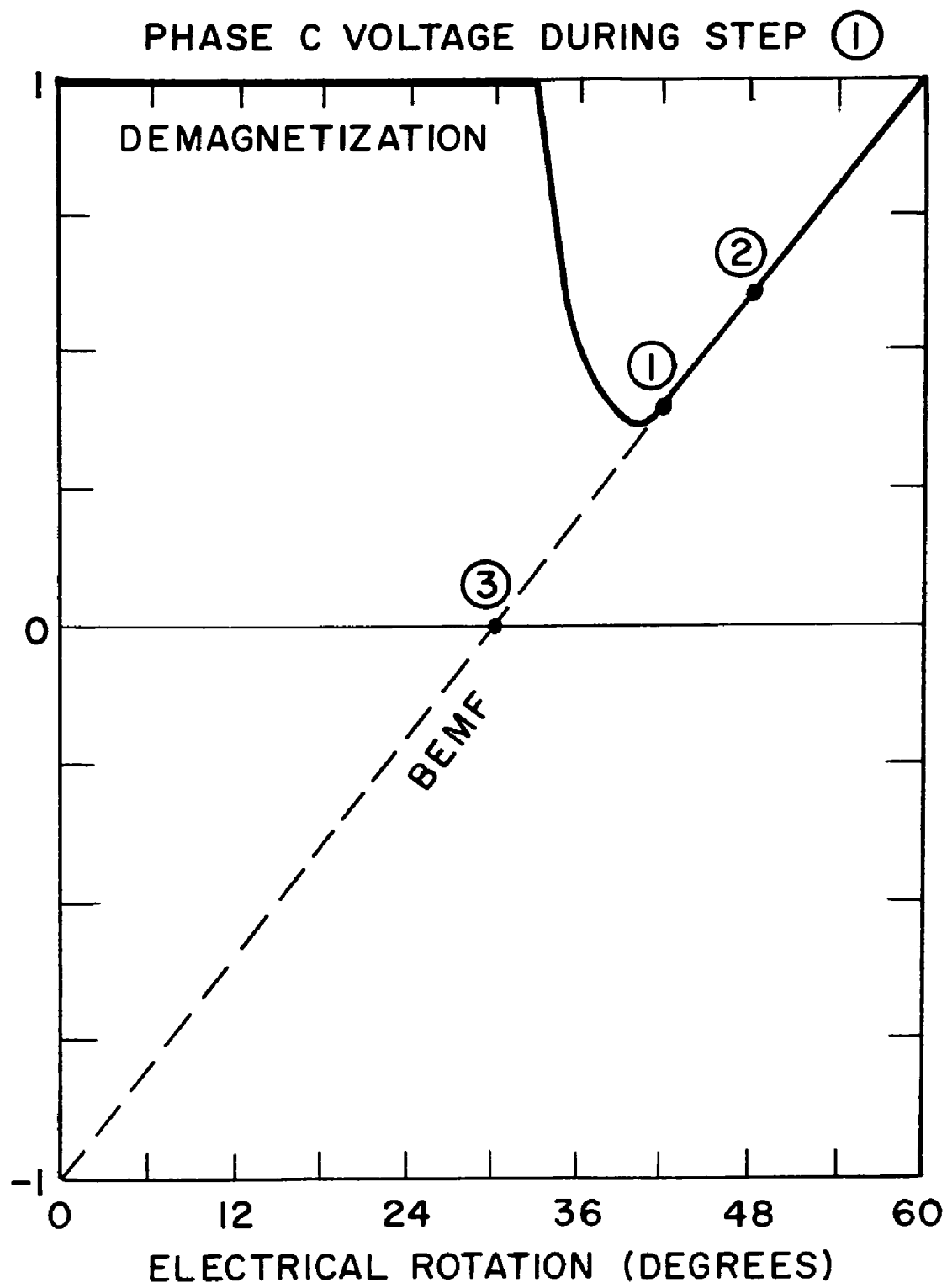
Figure 9:
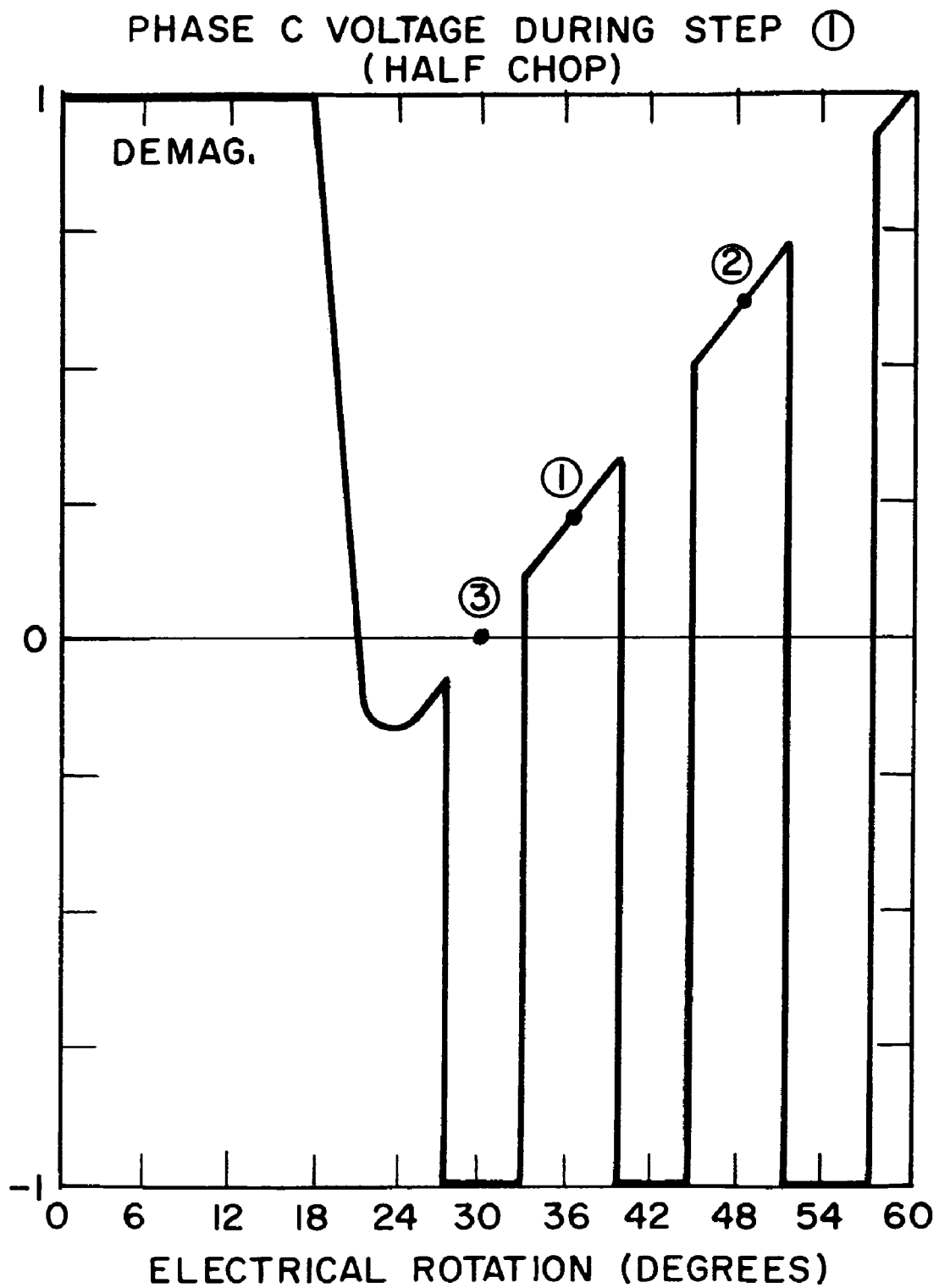

FIG. 8 graphically depicts the voltage at one of the motor phases over a single step of a commutation cycle during which the given phase is not driven; and FIG. 9 graphically depicts the voltage over a single commutation cycle step for the undriven phase in an alternative motor configuration.

DETAILED DESCRIPTION OF THE PREFERRED EMBODIMENTS

Figure 1:
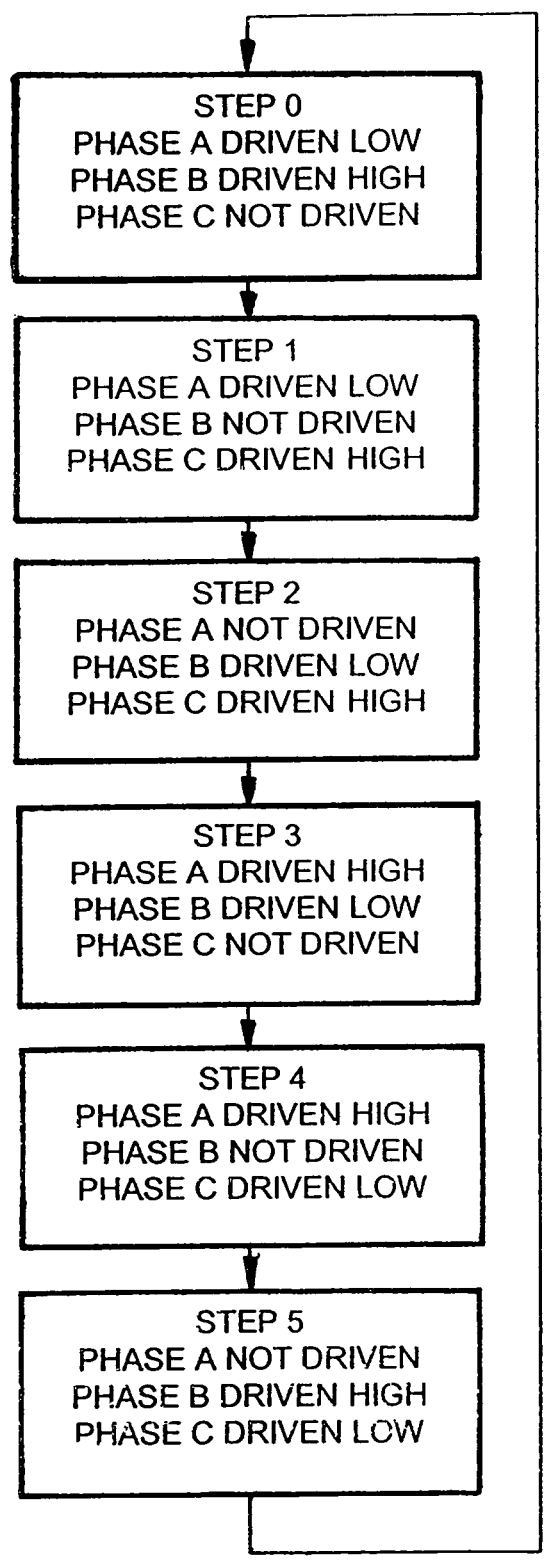
Figures 2A, 2B, 2C:
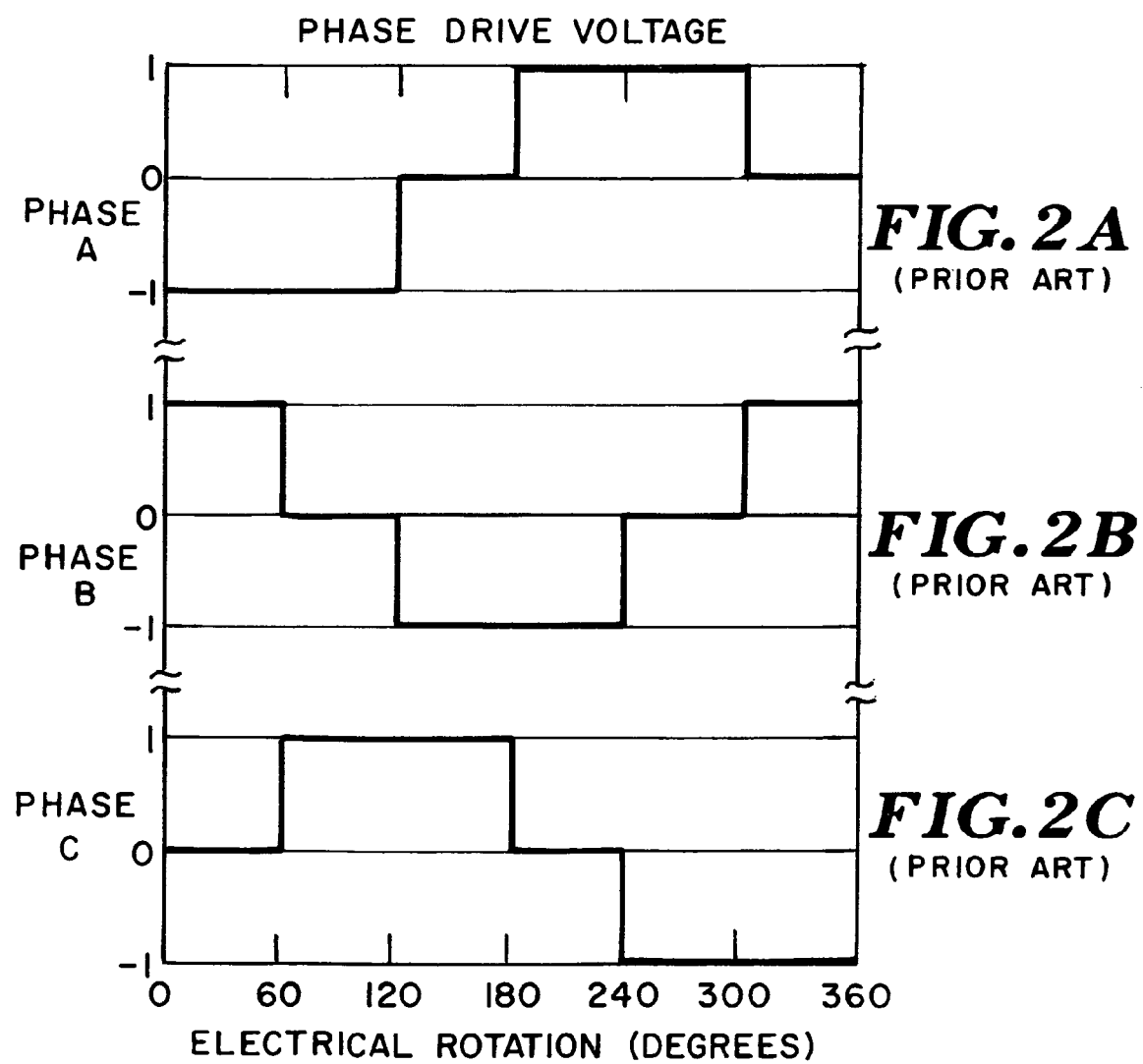
Figure 4:
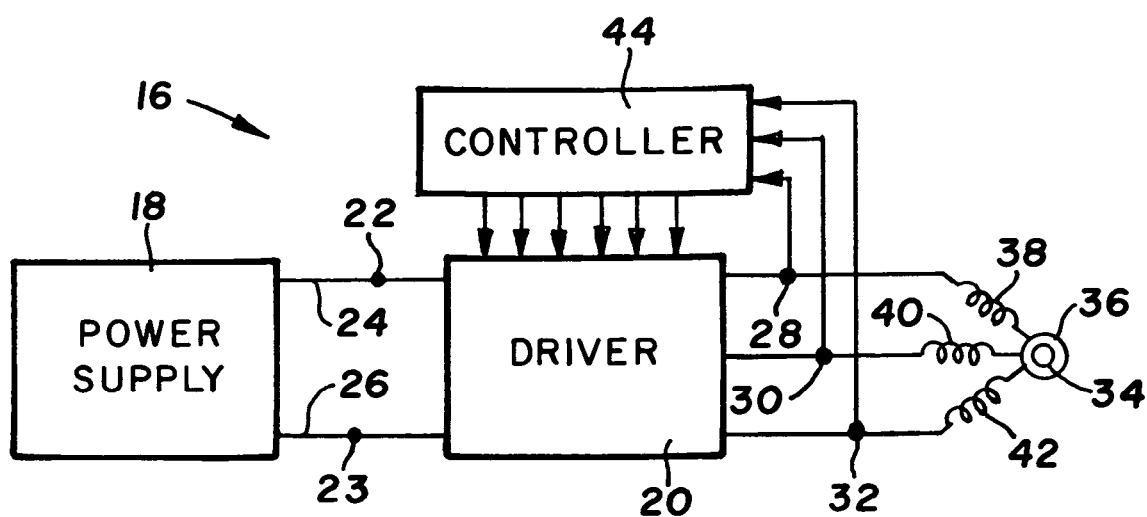

With further reference to the drawings, FIG. 4 shows a system 16 for coupling a 3-phase brushless DC motor to a DC power supply 18. System 16 includes a commutation circuit or driver 20 having input terminals 22 and 23 coupled respectively to a high voltage line 24 and low voltage line 26 of the power supply. Driver 20 has several output terminals 28, 30 and 32 coupled to the motor. The motor includes a rotor 34 surrounded by a stator 36 and supported for rotation relative to the stator through selective driving of stator windings 38, 40 and 42 which represent angularly separated phases A, B, and C of the motor. Driver output terminals 28, 30 and 32 are coupled respectively to stator windings 38, 40 and 42.

System 16 further includes a controller 44, preferably a microprocessor, for controlling driver 20 to selectively and alternatively apply the high voltage and the low voltage individually to stator windings 38, 40 and 42. Controller 44 further is coupled to output terminals 28, 30 and 32 to receive back EMF voltages from the stator windings, in each case during a step in the commutation cycle when the winding is not driven, i.e. when neither the high voltage nor the low voltage is applied to that stator winding. During each such step or time, controller 44 locates the zero crossing of the back EMF signal to determine the rotor angular position relative to the stator. The rotor position information is used by the controller to synchronize the commutation cycle with the rotor position.

Figure 5:
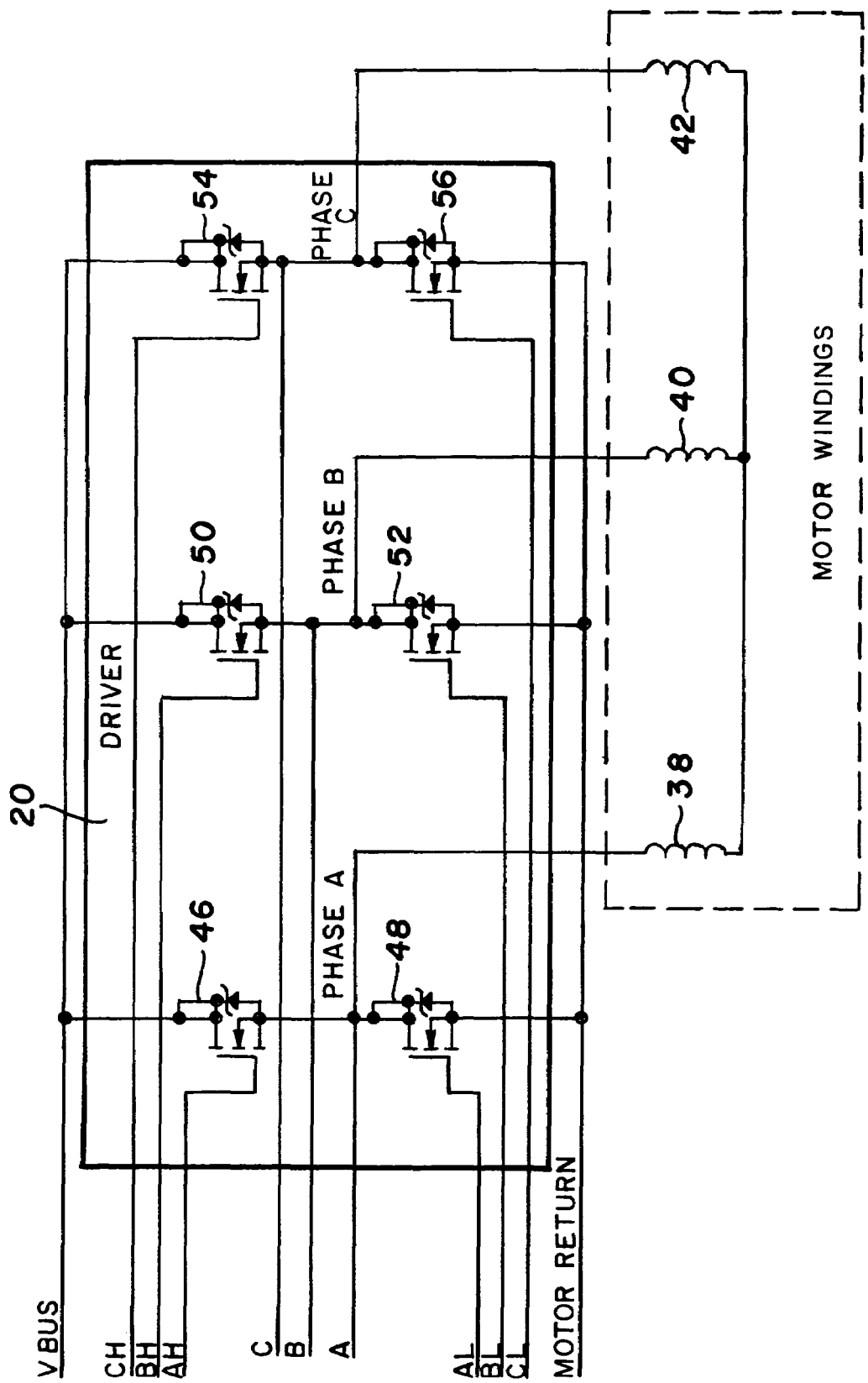
FIG. 5 is a schematic view of the driver.

As shown schematically in FIG. 5, driver 20 includes a series of switching elements in the form of field-effect transistors (FET's) coupled between high voltage line 24 (labeled "VBUS") and low voltage line 26 (labeled as "MOTOR RETURN"). A pair of switching elements 46 and 48 are coupled in series between lines 24 and 26, with terminal 28 coupled between the switching elements to associate the pair with stator winding 38. In similar fashion, a pair of switching elements 50 and 52 are serially coupled and associated with stator winding 40, and a serially coupled pair of switching elements 54 and 56 are associated with stator winding 42. The inputs labeled AH, BH and CH are control signals provided to the respective gate terminals of switching elements 46, 50 and 54 coupled between high voltage line 24 and the driver output terminals. Inputs AL, BL, and CL are the control inputs coupled to the gate terminals of switching elements 48, 52 and 56 between the respective driver output terminals and low voltage line 26.

With respect to motor phase B, signals BH and BL are provided to the gate terminals of switching elements 50 and 52. A source terminal of FET 50 is coupled to high voltage line 24, while a drain terminal of the FET is coupled to output terminal 30. A source terminal and a drain terminal of FET 52 are coupled to terminal 30 and low voltage line 26 respectively. Output terminal 30 is coupled to stator winding 40 as previously noted, and further provides an input "B" to controller 44.

Each FET is controllably switched by the input to its gate terminal. A logic level "1" to the gate of FET 50 switches FET 50 "on" to provide the high voltage at terminal 30, assuming FET 52 is in the "off" condition. Likewise, a "1" input BL to the gate of FET 52 switches FET 52 to the "on" state to drive the voltage of terminal 30 to the low voltage, again assuming FET 50 is "off." When both inputs BH and BL are at the low or "0" level, switching elements 50 and 52 are both "off" to set stator winding 40 in an inactive state in which the winding is not driven. Switching elements 50 and 52 function as high impedance resistors, tending to set the voltage at terminal 30 to a center voltage midway between the high voltage and the low voltage.

Switching elements 46, 48, 52 and 56 are similarly governed by the inputs to their gate terminals. Each pair of switching elements is operable to maintain the associated driver output terminal in one of three states: a first active state at the high voltage for driving the corresponding stator winding at the high voltage; a second active state at the low voltage for driving the corresponding stator winding at the low voltage; and an inactive state in which the corresponding stator winding is not driven.

Figures 6, 7:
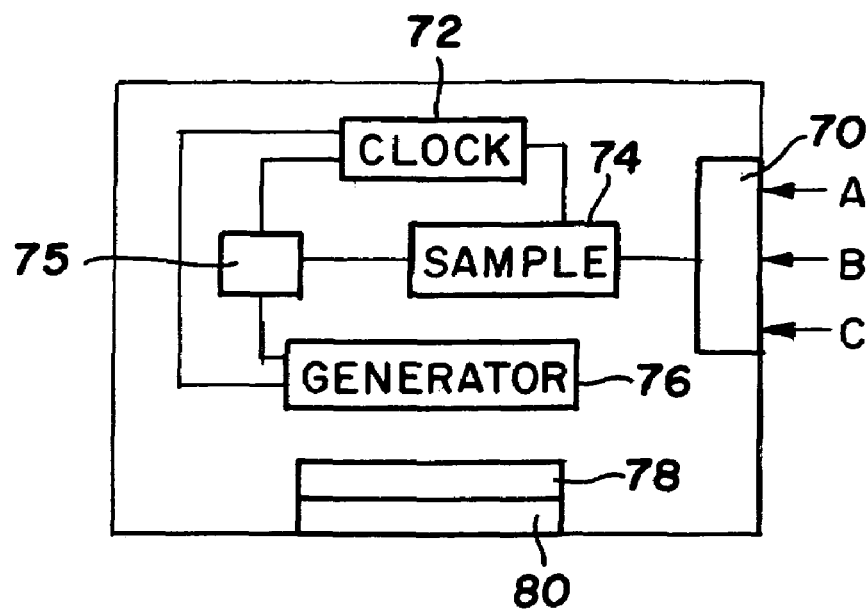
FIG. 6 is a more detailed diagrammatic view of the controller.
FIG. 7 is a diagrammatic view of a commutation algorithm employed to digitally control the switching elements and voltage control functions in accordance with the invention.

As seen in FIG. 6, controller 44 is a microprocessor configured to control driver 20 based on current rotor position information received from stator windings 38, 40 and 42. The controller includes a bank of data registers providing a storage area 70 for receiving inputs A, B and C from the stator windings. Each of inputs A-C is filtered or otherwise converted to a digital input. Controller 44 includes an internal clock 72. A sampling function 74, preferably a computer program, is coupled to clock 72 and storage area 70. A second storage area 75 is coupled to sampling function 74 and the clock. A center point locating and generating function 76 is coupled to receive inputs from internal clock 72 and storage area 75. Generating function 76 is operatively coupled to a commutation algorithm 78 stored in the controller. A third storage area 80 includes six data registers, one corresponding to each of the driver control inputs AH, BH, CH, AL, BL, and CL.

Storage area 70 receives inputs A-C in the form of back EMF signals, and accordingly samples each of the inputs only when the corresponding stator winding is not driven. Center point generating function 76 uses the inputs from the clock and storage area 75 to locate center points of the commutation cycle steps, first to initiate the commutation cycle synchronous with the correct angular position of rotor 34, and then to repeatedly step the commutation algorithm through the commutation cycle in synchronization with rotor rotation, i.e. synchronized with motor speed. To this end, function 76 uses inputs A-C (current rotor angular position information) and the clock input to "look ahead" in the sense of projecting future rotor positions at which the commutation algorithm is to be stepped through the commutation cycle.

As best seen from FIGS. 4 and 6, controller 44 steps driver 20 through the commutation cycle by simultaneously providing control inputs AH through CL individually to the gate terminals of switching elements 46-56. The commutation algorithm is shown in detail in FIG. 7, with each row corresponding to one of the control inputs, and each column corresponding to one of the discrete steps in the commutation cycle, steps 0, 1 . . . 5. Considering step "0," the AL input is a digital logic high or "1" at the gate of FET 48. With FET 46 off (input AH at 0), output terminal 28 is biased to the low voltage to drive stator winding 38 at the low voltage. Meanwhile, input BH also is set at 1, maintaining FET 50 on to bias output terminal 30 to the high voltage for driving stator winding 40 at the high voltage. Inputs CH and CL to the gates of FET's 54 and 56 are set to 0. With FET's 54 and 56 both switched off, output terminal 32 is not driven. Accordingly, during step 0, output terminal 28 is active in the sense of being biased to the low voltage, output terminal 30 is active in the sense of being biased to the high voltage, and output terminal 32 is inactive.

Primary steps 1-5 are similar. In each case, two of the switching elements are selectively switched on to bias two of the output terminals at the high voltage and low voltage respectively, while maintaining the third output terminal in the inactive state whereby its corresponding stator winding is not driven and its back EMF signal can be used to determine rotor position.

A feature of the present invention resides in the capacity of controller 44 to synchronize the commutation cycle with motor position and speed, without directly sensing zero crossings of the back EMF signal to locate the angular or temporal centers of the commutation cycle steps. Accordingly, the controller can be used in brushless DC motor systems in which the zero crossings cannot be directly measured.

One such case is illustrated in FIG. 8, which shows the voltage at phase C (stator winding 42) during a single selected segment of the commutation cycle, namely the step during which phase A is driven at the low voltage, phase B is driven at the high voltage, and phase C is not driven. During the cycle immediately preceding the step shown, phase C is driven at the high voltage and accordingly is magnetized. Demagnetization starts at the beginning of the cycle step shown (at zero degrees) and continues beyond the midpoint of the cycle step. As a result, the voltage at phase C remains at the high level beyond the center point. The back EMF voltage over this portion of the cycle step is illustrated in broken lines, crossing the zero voltage level at point "3" to signify 30 degrees as the cycle step center point. In reality, however, there is no zero crossing at the center point, as the voltage remains high due to the demagnetization effect.

Accordingly, sampling function 74 is configured to sample the back EMF voltage at points "1" and "2" corresponding to 42 degrees and 48 degrees along this segment of the commutation cycle. The first and second voltage levels and their corresponding angular locations are provided to second storage area 75 for use by center point generator 76. The center point generator applies the measured voltages and known angular locations to locate center point 3 through extrapolation.

Preferably, points 2 and 3 or any other pair of suitable measurement points are determined imperically, by coupling the motor phases individually to an oscilloscope or other suitable instrument to view the voltages during cycles when the phase is not driven. By selecting measurement points that occur after demagnetization is complete, the correct back EMF voltages are measured and accordingly applied to locate the center point with accuracy.

FIG. 9 illustrates another case in which the back EMF voltage is not available for direct measurement at the center point or zero crossing of a selected commutation cycle segment (during which the given phase is not driven). During the segment or step shown, phase A (stator winding 38) is driven at the low voltage, phase B (stator winding 40) is chopped or pulsed at the high voltage, while phase C is not driven. Phase C demagnetizes during an initial portion of the cycle segment as before, but demagnetization is complete before point "3," the 30 degree center point. Thus, in the absence of chopping, the zero crossing could be measured directly to indicate the center of the step.

Because of the chopping, the back EMF signal does not cross zero at the cycle segment center point. Accordingly, the back EMF voltage is measured at points "1" and "2" corresponding to peaks of the signal during which phase B is driven at the high voltage. As before, the motor is analyzed to view the voltage over selected cycles when each phase is not driven. Preferably, the motor is operated at a variety of different speeds during this analysis, to ensure that points 1 and 2 are suitable for measuring back EMF voltage at different motor speeds.

In accordance with the present invention, brushless DC motors can be commutated based on measuring back EMF voltages in non-driven phases regardless of whether demagnetization, pulsing of driven phases or other factors prevent measuring zero crossings of the back EMF signal.

What is claimed is:

1. A device for controlling a brushless DC motor including:
   a first data storage area including a plurality of inputs adapted to be coupled individually to different stator windings corresponding to different motor phases of a brushless DC motor to receive voltage information corresponding to voltages at their associated stator windings;
   a commutation control signal generator adapted to be coupled to a commutation circuit of a brushless DC motor to provide control signals to the commutation circuit and thereby operate the commutation circuit according to a commutation cycle having a plurality of communication cycle segments symmetrically arranged over a motor electrical rotation of 360 degrees including selected commutation cycle segments during which a given one of the stator windings is not driven;
   a sampling function operatively associated with the first data storage area, operative during each of the selected commutation cycle segments to sample the voltage information of the given stator winding at first and second predetermined points in the selected segment corresponding to first and second angular locations along the motor electrical rotation;
   a second data storage area associated with the sampling function for receiving the sampled voltage level information as first and second voltages corresponding respectively to the first and second angular locations;
   a center point generator associated with the second data storage area, adapted to use the first and second voltages in combination with the first and second angular locations to generate a center point signal indicating an angular center of one of the commutation segments; and
   a timing function;
   wherein the commutation control signal generator is associated with the timing function and the center point generator and adapted to use the center point signal to generate the control signals in synchronism with motor speed and position.

2. The device of claim 1 wherein:
   the commutation cycle includes at least two of the selected segments associated with each of the stator windings, and the center point signal associated with each one of several sets of the first and second predetermined points corresponds to the same phase as the predetermined points.

3. The device of claim 2 wherein:
the center point signal and the associated first and second predetermined points correspond to the same selected segment.

4. The device of claim 2 wherein:
the voltage level information consists essentially of the back EMF signal from the stator winding associated with each selected segment, and the center point generator is configured to generate center points corresponding to all selected segments.

5. The device of claim 1 wherein:
the sampling function is adapted to sample the voltage information only at predetermined points corresponding to angular locations that follow the center point of the associated selected segment.

6. The device of claim 5 wherein:
the center point generator is adapted to locate the center point equivalent to a zero crossing between voltages of opposite polarities.

7. The device of claim 6 wherein:
the center point generator is adapted to use the timing function to project future center points.

8. The device of claim 1 wherein:
the commutation control signal generator comprises a commutation algorithm governing a plurality of digital inputs to a commutation circuit.

9. The device of claim 1 wherein:
the commutation control signal generator, the sampling function, and the center point generator reside with a single information processor.

10. In a brushless DC motor configuration, a process for maintaining a commutation cycle synchronized with motor position, including:
sensing a voltage at a given one of a plurality of stator windings corresponding to different phases of a DC motor operated according to a commutation cycle encompassing 360 degrees of electrical rotation composed of symmetrically arranged commutation cycle segments including selected segments during which the given stator winding is not driven;
sampling the sensed voltages at first and second predetermined points within one of the selected commutation cycle segments corresponding respectively to first and second angular locations along the electrical rotation, to indicate respective first and second voltages in the given stator winding at the first and second predetermined points;
using first and second voltages in combination with the first and second angular locations to locate a center point corresponding to a center of one of the commutation cycle segments; and
generating a center point signal as an indication of a current angular or temporal position of the center point, and using the center point signal to synchronize the commutation cycle with motor angular position.

11. The process of claim 10 wherein;
using the first and second voltages to locate a center point comprises determining a center point of one of the selected commutation cycle segments.

12. The process of claim 11 wherein:
the center point is the center point of said one selected segment.

13. The process of claim 10 wherein:
the commutation cycle includes respective pluralities of selected segments during which each one of the stator windings is not driven;
said sensing comprises sensing voltages at a stator winding corresponding to each of the motor phases;
sampling the sensed voltages comprises sampling the first and second voltages at respective pairs of first and second predetermined points in the respective selected segments to identify respective pairs of first and second voltages; and
using the first a second voltages comprises using each pair of first and second voltages to determine a center point of one of the communication cycle segments.

14. The process of claim 10 further including:
locating center points repeatedly in conjunction with the timing information to project future commutation cycle segment center points.

15. The process of claim 14 further including:
using the center point signals and the timing information repeatedly to project future timing points for initiating commutation cycle segments.

16. The process of claim 10 wherein:
using the first and second voltages to determine a center point comprises using the first and second voltages and their corresponding angular locations to describe a linear function relating voltage to angular position over an angular span of said one selected segment.

17. The process of claim 10 wherein:
sampling the sensed voltages at the predetermined points comprises selecting only predetermined points corresponding to angular locations that follow the center point.

18. The process of claim 10 wherein:
sensing the voltage consists essentially of sensing the back EMF voltage of said given stator winding.

19. The process of claim 18 further including:
generating and analyzing the back EMF voltage signal of the given stator winding while operating the DC motor at different speeds to determine suitable angular locations within the one selected cycle segment for selecting the predetermined points.

20. A system for controlling a brushless DC motor, including:
a motor commutation circuit adapted for coupling between a DC power supply and a plurality of stator windings corresponding to different motor phases, adapted to apply to each phase one of several alternative states including: (i) a first active state for biasing the output terminal to a high voltage to drive an associated stator winding at the high voltage; (ii) a second active state for biasing the output terminal at a low voltage to drive the associated stator winding at the low voltage; and (iii) an inactive state in which the associated stator winding is not driven;
a controller operatively coupled to the commutation circuit to selectively apply different ones of the alternative states to different phases to operate the motor according to a commutation cycle composed of commutation cycle segments arranged symmetrically about 360 degrees of electrical rotation;
wherein the controller is coupled to receive a back EMF voltage signal from each of the stator windings, and comprises: (i) a sampling function adapted to sample the back EMF signal from a given stator winding at first and second predetermined points within a selected commutation cycle segment during which the given stator winding is not driven, said predetermined points corresponding to first and second angular locations along the electrical rotation yielding respective first and second voltages; (ii) a center point locating function configured to use the first and second voltages and their corresponding angular locations to determine a commutation cycle segment center point; (iii) a center point generator for generating a center point signal indicating a current angular position of the center point along the 360 degrees of electrical rotation; and (iv) a commutation circuit control function for determining cycle segment center points and starting points in response to receiving the center point signal thereby to operate the commutation circuit according to the commutation cycle in synchronous relation to motor position and speed.

* * * * *